(12) United States Patent
Vilajosana Guillen et al.

(10) Patent No.: US 9,330,569 B2
(45) Date of Patent: May 3, 2016

(54) SENSOR MODULE FOR GROUND AND SYSTEM PROVIDING A PLURATY OF THESE

(75) Inventors: Ignasi Vilajosana Guillen, Barcelona (ES); Jordi Llosa Melich, Barcelona (ES)

(73) Assignee: Worldsensing, S.L., Barcelona (ES)

( * ) Notice: Subject to any disclaimer, the term of this patent is extended or adjusted under 35 U.S.C. 154(b) by 249 days.

(21) Appl. No.: 14/234,502

(22) PCT Filed: Jul. 25, 2012

(86) PCT No.: PCT/IB2012/053778
§ 371 (c)(1),
(2), (4) Date: Jan. 23, 2014

(87) PCT Pub. No.: WO2013/014613
PCT Pub. Date: Jan. 31, 2013

(65) Prior Publication Data
US 2014/0139360 A1    May 22, 2014

(30) Foreign Application Priority Data
Jul. 25, 2011  (ES) .................................. 201131267

(51) Int. Cl.
*B60Q 1/48*  (2006.01)
*G08G 1/14*  (2006.01)
*H04W 4/00*  (2009.01)

(52) U.S. Cl.
CPC .................. *G08G 1/142* (2013.01); *G08G 1/14* (2013.01); *B60Q 2200/00* (2013.01); *H04W 4/00* (2013.01)

(58) Field of Classification Search
CPC .............................. H04W 4/00; B60Q 2200/00
See application file for complete search history.

(56) References Cited

U.S. PATENT DOCUMENTS

| 8,692,688 B1 * | 4/2014 | Tuxen | B60Q 9/002 340/425.5 |
| 2008/0271907 A1 * | 11/2008 | Allen | G08G 1/02 174/50 |

FOREIGN PATENT DOCUMENTS

| CN | 201114012 Y | 9/2008 |
| CN | 201402531 Y | 2/2010 |
| CN | 201859545 U | 6/2011 |
| WO | WO2009117755 A2 | 10/2009 |

* cited by examiner

*Primary Examiner* — Shirley Lu
(74) *Attorney, Agent, or Firm* — Hayes Soloway PC

(57) ABSTRACT

The invention relates to a sensor module 1 for embedding in street A, comprising an outer housing (casing, box) 2 fitted with a lid 3 in the housing of which there is at least one sensor 4 of presence or arrival/departure of vehicles, characterized by the fact that it is comprised of a second box 6 arranged inside the first housing 2 and attached to the lid 3 and inside which is the sensor 4, so as to obtain a module made of two parts, one that remains in the ground and one that is easily removed, removing it at the same time or the sensors with associated electronics. The invention also relates to a system using a plurality of sensor modules as this, in communication with each other.

9 Claims, 3 Drawing Sheets

SENSOR MODULE FOR GROUND AND SYSTEM PROVIDING A PLURATY OF THESE

The present invention relates to a robust sensor module for asphalt which allows a quick and convenient assembly, and also relates to a system for management of parking spaces comprising a plurality of said sensors.

BACKGROUND OF THE INVENTION

The present invention is made in the field of devices, procedures and systems for the intelligent management of parking spaces in urban environments. Based largely but not exclusively on wireless communication technologies and detection sensors, these systems effectively address the management of parking both for loading and unloading zones and for parking of private vehicles.

With respect to loading and unloading zones, using sensors in areas specifically designated for that purpose and using means of local identification, it is possible to charge drivers for the exact time they used the loading and unloading zone, and impose fines for failing to pay for the use of those areas.

In regard to parking areas for private vehicles, the use of such sensors with mobile payment platforms or smart phone applications and/or indicating signs visible to drivers, reduces search time for parking spaces and facilitates the charging management of the use of public parking spaces, as well as measure the effectiveness of measures to deter use of private vehicles in urban environments.

This same technology can be used to detect offenders and vehicles parked in prohibited areas.

This technology involves the use of sensors, specifically sensors embedded into the asphalt, specifically in parking spots and areas of load/unload.

These sensors should be, on one hand, protected, and on the other hand, must be accessible for maintenance, particularly for recharging batteries.

It is also desirable that their installation and removal is inexpensive, and allows to recover the maximum amount of components given the large number of sensors installed.

The inventors have noted that none of the sensor modules of the prior art satisfy these requirements, and therefore considered necessary to develop a new sensor module.

DESCRIPTION OF THE INVENTION

To this end, the present invention proposes a sensor module for asphalt, comprising an outer housing provided with a lid, in said housing being arranged at least one sensor detecting presence or arrival/departure of vehicles, characterized by the fact that it comprises a second box placed inside the outer housing and attached to the top and inside which is the sensor.

This device solves the problems of the prior art because:

The module is made of two parts, one remains in the asphalt and the other is easily removed, and with it the sensors with associated electronics. Thus, it is not necessary to disassemble the whole sensor, but only what is considered to have a higher cost, and all that without disassembling the electronics.

Also, if the road is to be redone, one can leave the outer housing, which is embedded into the road and end which is eventually lost, and remove the rest. The solutions of the prior art do not offer this possibility, as they must be removed in their entirety.

Preferably, the module according to the invention comprises a battery disposed between the bottom of the outer housing and inner box, and more preferably comprises a spring between the battery and the bottom of the outer housing. This further facilitates and speeds-up maintenance of the module, since by removing the fastening means of the lid with the outer housing, the lid assembly and the inner box pop up.

As per other optional features of the invention, the sensor module comprises:

anchoring vertical ribs on the outer surface of the outer casing.

anchoring legs attached externally to the outer housing and retaining means provided in the asphalt.

The inner box comprises support legs on the bottom of the outer housing, leaving space for a battery between said legs of support.

Two magnetic sensors.

Ultrasonic, vibration or temperature sensors.

A unit of wireless data transmission.

The connection between the cover and first (outer) and second (inner) boxes is screwed.

The envelope material is polycarbonate, glass fiber and/or nylon.

The invention also relates to a system for parking management, comprising a plurality of sensor modules according to any of the variants described and a plurality of parking meters in communication with said sensors.

Preferably, communication between sensor modules and parking machines is realized through intermediate sensor modules.

Advantageously, the system comprises indicating signs visible to drivers and communicating with the other system components.

More preferably, the system comprises means for communicating with mobile phone networks or the Internet.

Finally, the system includes indicator panels associated with specific sensor modules.

SHORT DESCRIPTION OF DRAWINGS

For a better understanding of the above exposed, accompanying drawings are presented, which schematically and solely by way of nonlimiting example show a practical embodiment.

DESCRIPTION OF A PREFERRED EMBODIMENT

Figure 1:
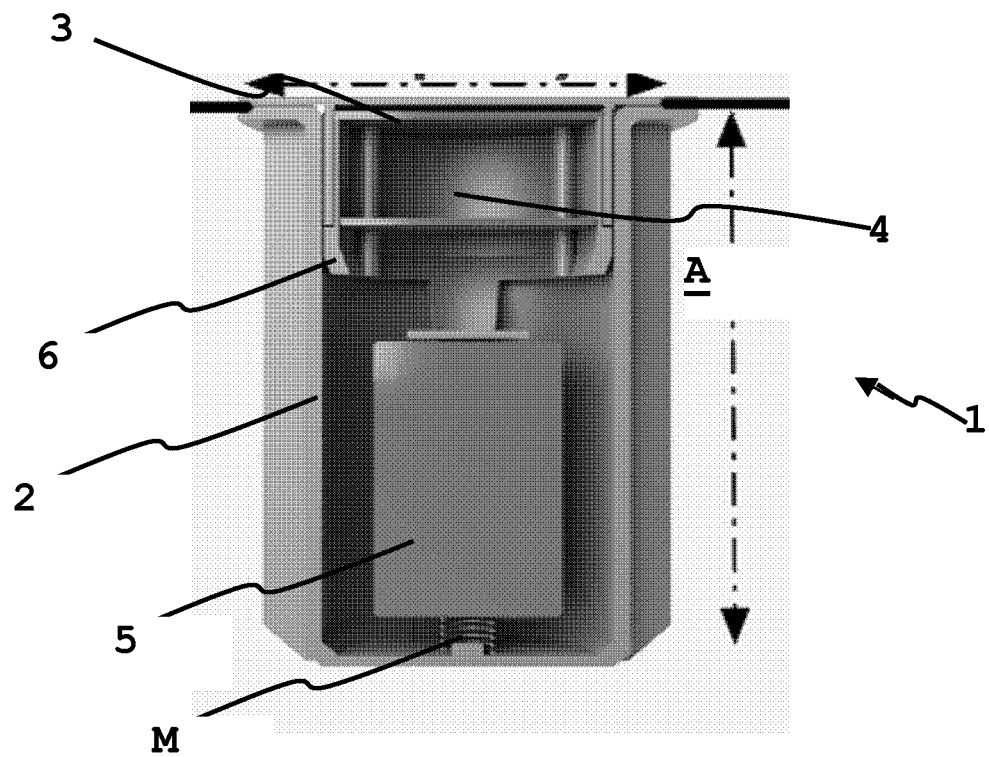
FIG. 1 is a schematic section of the sensor module according to the invention.

As illustrated in FIG. 1, the invention relates to a sensor module 1 for embedding in street A, comprising an outer housing (casing, box) 2 fitted with a lid 3 in the housing 10 of which there is at least one sensor 4 of presence or arrival/departure of vehicles, characterized by the fact that it is comprised of a second box 6 arranged inside the first housing 2 and attached to the lid 3 and inside which is the sensor 4.

The module contains a battery 5 placed between the bottom of the outer housing 2 and the second (inner) box 6.

A specialized battery for industrial use is preferred, which is capable of withstanding high temperature variations, as is the case especially in many Spanish cities. This may be for example a Li-SOCl2 at 3.6 V. A battery of this type ensures autonomy of 5 years of the sensor module of the invention, taking into account the consumption needed to power the sensor, the communication unit and the electronics.

As seen in FIG. 1, the module comprises a spring M between the battery 5 and the bottom of the first box. This spring is compressed when assembling the module so that when unscrewing the lid of the outer casing, the lid and the inner casing, along with the battery, pop up; thus allowing for easy removal.

To ensure an effective anchorage in the asphalt, vertical ribs 7 are provided for anchorage in the outer surface of the first housing 2, which increase the contact surface between the module and asphalt or filler and fixation material eventually used.

To further enhance the anchoring, one can also provide anchoring legs 8 fitted with retaining means 9 vertically in the asphalt.

According to an especially preferred variant of the invention, the second housing 6 comprises support legs 10 above the bottom of the first housing 2, giving space between said legs for a battery 5.

According to a particularly advantageous feature of the invention, the module includes two magnetic sensors 4. When operating with the signals of two magnetic sensors instead of one, you can subtract high magnetic fields, and correctly identify the parked vehicles.

Preferably, these are magnetic sensors capable of measuring the three components of the magnetic field. From the three components, it is possible to discriminate cases of difficult detection from a single component, and therefore enhance the robustness of the detection system.

Optionally, the module of the invention may incorporate ultrasonic, vibration or temperature sensors which, together with the magnetic sensors, can improve the reliability of the signal.

Provided is also a wireless data transmission unit, to communicate with adjacent modules or other data units.

Figure 2:
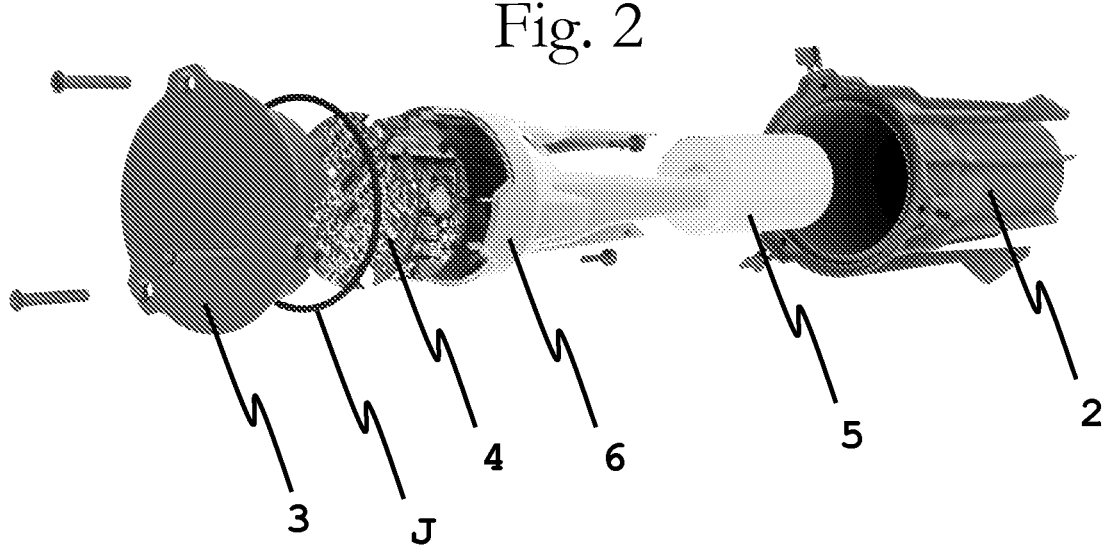
FIG. 2 is a dissection exposing the main elements of the module, including sensors, the associated electronics and battery.
Figure 3:
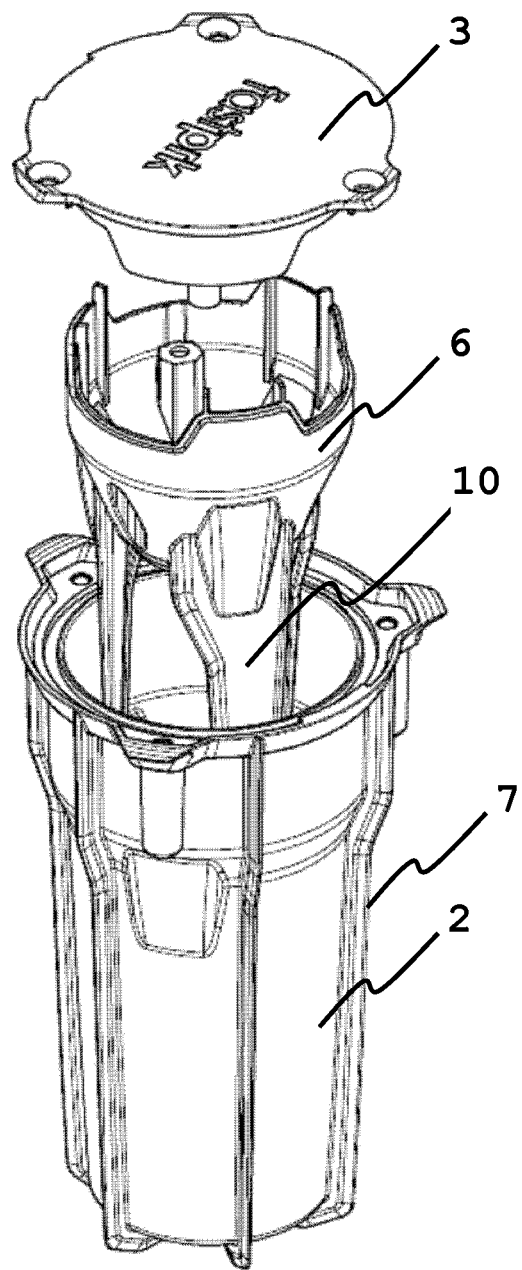
FIG. 3 shows in perspective and dissected the structural elements.
Figure 4:
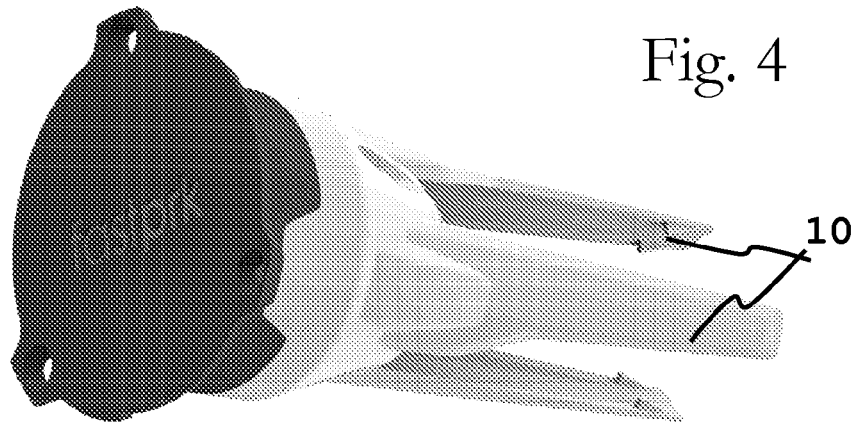
FIG. 4 shows the assembly constituted by the removable lid and the second (inner) box, which is provided with support legs.
Figure 5:
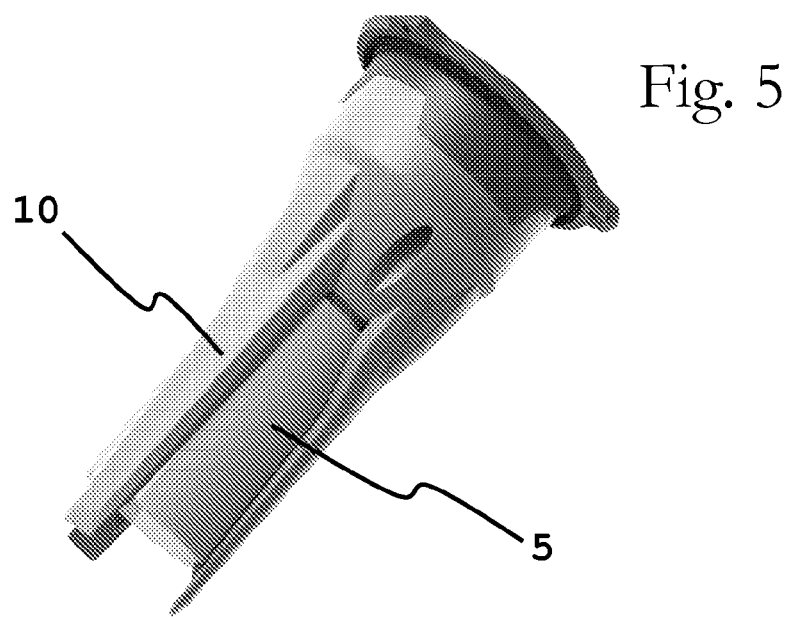
FIG. 5 shows the assembly of FIG. 4, but to which the battery has been added.
Figure 6:
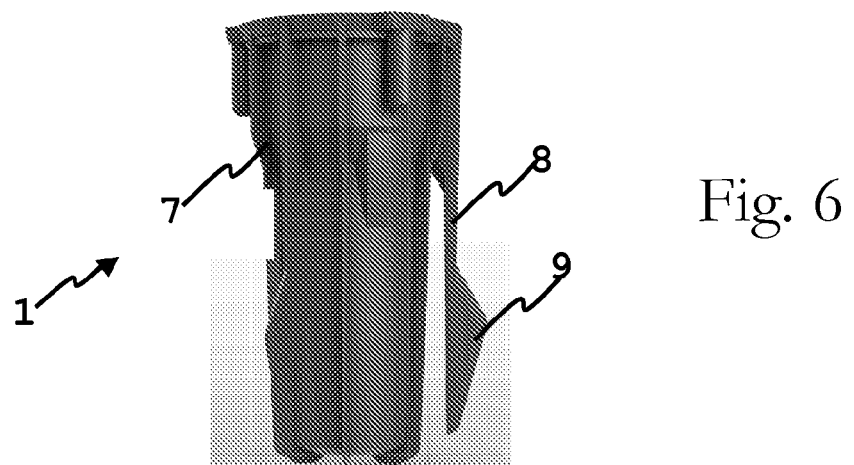
FIG. 6 shows a variant provided with anchoring legs.

As can be seen in FIG. 2, the joint between the lid and the first 2 and second boxes 6 is screwed. As is standard practice, the type of screw heads are different for different cities.

The invention also relates to a system for parking management comprising a plurality of sensor modules according to any of the variants presented above and a plurality of parking meters in communication with said sensors. Thus, it is possible to have a network of sensors for the effective management of loading and unloading areas and parking spaces, among other applications.

As is known in the prior art, the present invention system of communication between remote sensor modules and parking meters is facilitated by hopping via intermediate sensor modules, i.e. according to the technique called multihop.

According to a first embodiment of the system of the invention, this is used for managing the loading and unloading areas. According to this embodiment, 5 or 6 sensors are arranged in the loading and unloading area and are configured to provide status information, arrival or departure of a vehicle through an Internet connection near the aforementioned provisions for the loading and unloading area. If, within range of a sensor module there is no such Internet access, multihop communications via other sensor modules is used.

The vehicle is identified by one of the following:
1) the driver, upon arrival, approaches the parking meter and enters a specific code associated with the vehicle or the driver's business, or uses an RFID/NFC;
2) the vehicle itself contains an RFID/NFC device with a range sufficient to communicate directly or via multihop with the Internet access, preferably located in the parking meter.

This allows any parking management, such as payment, sending of alerts for nonpayment, fine management, etc.

According to a second embodiment of the system, this is implemented to carry out an intelligent guidance system for parking spaces. Consisting of the same components as for the first embodiment but to which indicator panels are added which are visible to drivers and able to communicate with the other system components, and which may be mounted adjacent to the other road signs and traffic lights or in any strategic location visible to drivers of vehicles seeking parking.

The guide can also be done through a dedicated radio (FM/AM) channel and managed by the control platform providing occupancy data from the sensor modules. Obviously, information can be supplied to the driver via a mobile phone or any device with remote system access.

This application can be combined with built-in reserve parking spaces for the users. In this case, it is anticipated that some of the places have a display panel module associated with a sensor arranged in the parking space. This feature can be combined with procedures for preferential parking locations, or with a parking billing system with variable prices according to demand.

Another preferred application of the system of the invention is the detection of vehicle parking in prohibited or restricted areas, such as points that can compromise the flow of traffic or in areas dedicated to public vehicular traffic such as buses, or disabled parking spaces, among others.

Finally, it should be understood that all these system functions have practical application only if based on sensor modules which are versatile and quick to mount, inexpensive to manufacture and allowing for recuperation of the investment made, as is the case for the sensor module according to the invention. In fact, it has been found that installation of a module according to the invention involves no more than 10 minutes of installation.

It should also be understood that the module and the system can be used in any application in which the presence or passage of vehicles is detected, such as traffic management, the counting of vehicles, among others.

The invention claimed is:

1. A management system for parking spaces comprising:
a plurality of sensor modules each comprising:
an outer housing provided with a lid in a space of which there is at least one sensor, the sensor sensing at least one of a of presence, an arrival, and a departure of a vehicles; and
an inner housing disposed inside the outer housing and attached to the lid,
wherein the sensor is positioned inside the inner housing; and a plurality of parking meters in communication with said plurality of sensors,
wherein the communication between a portion of the plurality of sensors and the plurality of parking meters which are not in direct communication is achieved through hops via at least one intermediate sensor module.

2. The management system according to claim 1, further comprising indicating panels visible to drivers and communicating with at least a portion of the plurality of sensors.

3. The management system according to claim 1, further comprising display panels associated with a specific sensor modules, wherein the display panels indicate a reserved parking space.

4. The management system according to claim 1, wherein at least a portion of the plurality of the sensor modules are installed in designated areas where parking is restricted.

5. The management system according to claim 1, wherein a ground-sensor is in communication with an active sensor RFID located within a car, wherein the communication is facilitated by at least one of radio electronics and an Internet connection.

6. The management system according to claim 5, wherein a parking event is detected by the ground-sensor, wherein at least one of driver and vehicle identification information is entered manually into a parking machine or automatically deduced from a RFID/NFC via the parking meter or sensed from the car.

7. The management system according to claim 5, wherein an alert is generated if the car is detected to stay over an allowed maximum parking time, over a time paid based on a correlation of payment and a parking place, or if an active RFID identification number does not match an ID in a set of allowed IDs.

8. The management system according to claim 1, wherein an audit report is generated, the audit report aggregating an accumulated time a specific parking place or set of parking places has been occupied and a related payment, wherein the aggregation is contrasted to an actual payment made over a period of time.

9. The management system according to claim 1, further comprising a communication system for use with mobile phone networks or the Internet.

* * * * *